United States Patent [19]

Spangler

[11] 4,196,928
[45] Apr. 8, 1980

[54] MATERIAL PICKUP DEVICE

[76] Inventor: Glenn C. Spangler, 13645 Reeveston Rd., Houston, Tex. 77039

[21] Appl. No.: 812,920

[22] Filed: Jul. 5, 1977

[51] Int. Cl.² ............................................ A47L 13/52
[52] U.S. Cl. .................................... 294/55; 15/104.8; 294/1 BA
[58] Field of Search ...................... 294/1 R, 19 R, 8.5, 294/50.6, 50.8, 50.9, 51, 55, 99 R, 99 S, 106; 15/104.8, 257.1, 257.2, 257.7; 56/400.04, 400.11, 400.12, 400.13; 141/108; 248/95, 99, 100; 403/84, 87, 93, 103

[56] References Cited

U.S. PATENT DOCUMENTS

| | | | |
|---|---|---|---|
| 1,669,302 | 5/1928 | Lanman | 15/104.8 |
| 2,655,413 | 10/1953 | Russell | 403/93 X |
| 2,670,234 | 2/1954 | Roop | 294/99 R |
| 3,240,457 | 3/1966 | Backlund et al. | 248/99 |
| 3,347,573 | 10/1967 | Carter | 403/84 |
| 3,614,149 | 10/1971 | Clark | 294/51 X |
| 3,733,099 | 5/1973 | Szita | 294/55 |
| 3,778,097 | 12/1973 | Dorzan | 294/1 R X |
| 3,879,079 | 4/1975 | Nicholas | 294/19 R X |
| 3,977,715 | 8/1976 | Casci | 294/19 R |
| 4,012,067 | 3/1977 | Travis | 294/55 X |

*Primary Examiner*—Johnny D. Cherry
*Attorney, Agent, or Firm*—G. Turner Moller

[57] ABSTRACT

There is disclosed a device for picking up litter, small articles and the like, comprising a pair of handle members having a receptacle mounted on one of the members and a pusher mounted on the other. The handle members are pivotally connected to allow movement of the pusher toward the receptacle. The pivot axis defining handle movement is positioned such that the pusher describes a long, flat arc in front of the receptacle with the low point of the arc being somewhat in front of the receptacle. Appropriate positioning of the pivot axis is accomplished by offsetting the upper ends of the handle members in a direction toward the pusher. There is also disclosed an improved spring-hinge construction and means for disassembling the device for replacing the spring. In addition, there is disclosed an adjustable frame for supporting receptacles of different sizes.

17 Claims, 20 Drawing Figures

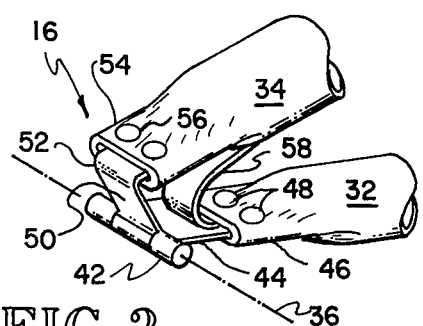
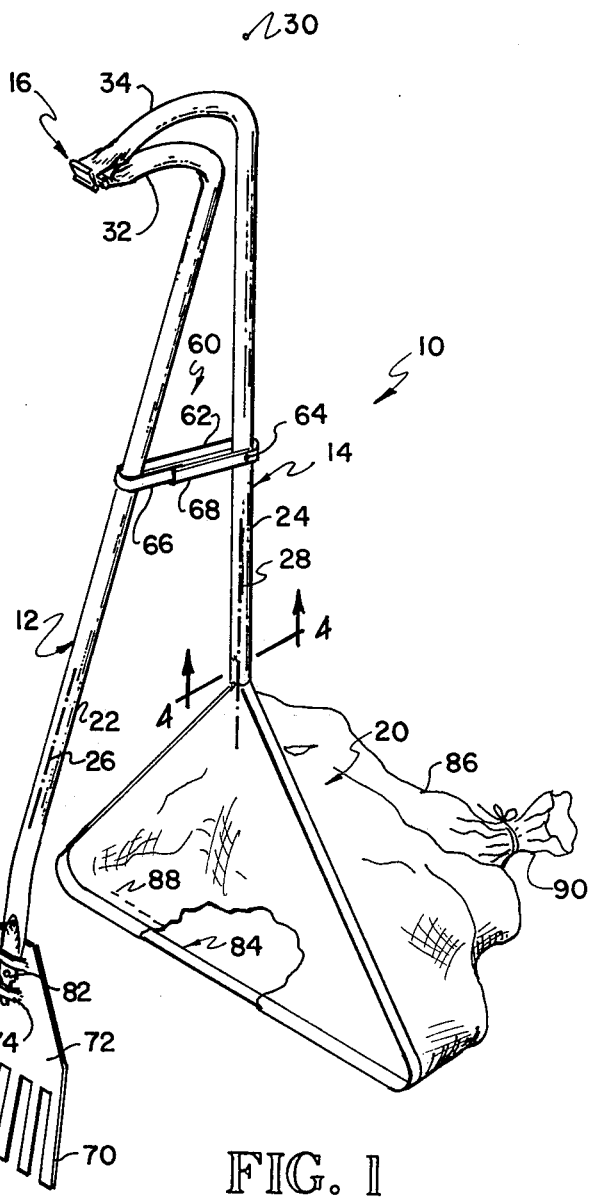
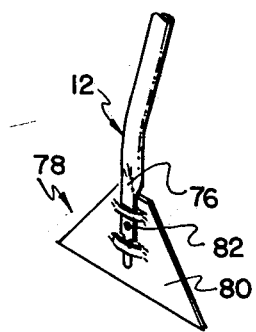
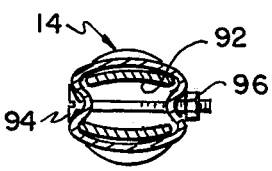

MATERIAL PICKUP DEVICE

This invention relates to a device for picking up small objects, such as fruit, nuts and the like, or litter, such as paper, cans, leaves, animal droppings and the like.

It is known in the prior art to provide litter retrievers basically comprising a pair of elongate pivoted handles having a receptacle on one handle and a pusher on the other. The handles are manually manipulated to effect relative movement of the pusher toward the receptacle to push litter into the receptacle. Typical disclosures are found in U.S. Pat. Nos. 3,778,097 and 3,977,715. Devices of this type typically have one or several of the following disadvantages: (1) if the receptacle carrying handle tends to remain stationary in use, as in U.S. Pat. No. 3,977,915, the pusher does not describe an efficient pushing path toward the receptacle; and (2) the arrangement of prior art devices requires the user to manipulate vertical extending handle portions, which is cumbersome compared to manipulation of horizontally or angularly disposed handle portions.

It is an object of this invention to provide an improved retriever for small articles, litter and the like which in use describes an efficient pushing path between a pusher and a receptacle.

Another object of the invention is to provide a retriever for small articles, litter and the like having horizontally or angularly disposed handle portions for conveniently manipulating a pusher and receptacle.

In summary, one aspect of this invention comprises a device for pushing material into a receptacle off of a generally horizontal surface including first and second elongate members having first and second major divergent portions defining intersecting axes, a pusher on the lower end of the first portions, a frame on the lower end of the second portion for mounting an open mouth receptacle with the open mouth facing the pusher, and means pivotally mounting the first and second members for relative arcuate movement about an axis juxtaposing the pusher and frame, the pivot axis being offset from the intersection of the intersecting axes along the path of movement.

Another aspect of the invention comprises an arrangement for supporting a sack to receive articles, including a peripheral frame with which the open end of a sack may be overlapped including means for expanding and contracting the length of the frame periphery to accommodate sacks of different size, and a handle supporting the frame so that part of the periphery can be supported on a surface to enable articles on the surface to be moved into the open end of the sack.

IN THE DRAWING

FIG. 1 is an isometric view of one embodiment of this invention;

FIG. 2 is an enlarged view of part of the device of FIG. 1 illustrating a detail of construction;

FIG. 3 is an isometric view of another embodiment of a pusher member;

FIG. 4 is an enlarged cross-sectional view of the device of FIG. 1 taken substantially along line 4—4 thereof as viewed in the direction of the arrows;

FIG. 7 is a view similar to FIG. 2 of a different type of hinge connection;

Figure 5:
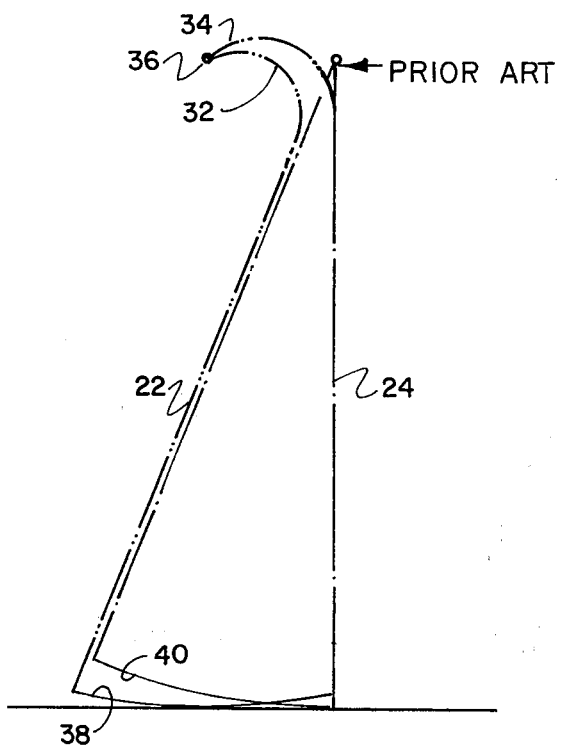
FIG. 5 is a line diagram illustrating the relative effectiveness of pusher paths of this invention as compared to prior art devices.

Referring to FIGS. 1 and 2, there is illustrated a device 10 for picking up litter, small articles and the like, comprising first and second elongate handle members 12, 14 pivoted together by a hinge connection 16. A pusher of any suitable size 18 is mounted on the first member 12 and a receptacle is mounted on the second member 14.

The handle members 12, 14 are conveniently made from bendable metallic tubing such as aluminum tubing, extruded plastic tubing which can be formed, and the like. The handle members 12, 14 each include major divergent portions 22, 24 having axes 26, 28 which intersect at an axis 30. The members 12, 14 also comprise minor divergent portions 32, 34 which intersect adjacent an axis 36 of the hinge connection 16. As will be more fully apparent hereinafter, grasping and pulling together of the minor portions 32, 34 causes the pusher member 18 to move toward the receptacle 20 in a plane or path of movement so that the lower end of the pusher 18 defines an arc of movement 38 best illustrated in FIG. 5.

It will be evident that the arc 38 has its lowest point somewhat forward of the receptacle 20 while the minor portions 32, 34 and the axis 36 are offset from the intersection 30 of the axes 26, 28 in the direction of the path of movement of the members 12, 14. Although one or more of the minor portions 32, 34 may be generally horizontal, it is preferred that the portions 32, 34 be of generally circular arc configuration for convenience of holding.

Because the arc 38 has its lowest point somewhat forwardly of the receptacle 20 and because the configuration of the device tends to cause the receptacle to remain stationary, the pusher 18 is capable of clearing, by a small margin, the framework which supports the receptacle 20 without sacrificing the long low travel toward the receptacle 20. Because at least one of the minor portions 32, 34 and preferably the underlying portion is generally circular, it is quite convenient to hold the minor portions without having to grasp the same.

This is in contrast to prior art devices of the type shown in U.S. Pat. No. 3,977,915 wherein the corresponding path of movement 40 is not nearly so effective as the path 38.

The hinge connection 16 may be of any convenient type and is illustrated as comprising a hinge 42 providing the axis 36 and having a first planar segment 44 extending into a flattened end 46 of the minor portion 32. Suitable rivets 48 or the like may be used to secure the segment 44 in place. The hinge 42 also includes a bent segment 50 having a flat end 52 extending into the flattened end 54 of the minor portion 34 while suitable rivets 56 or the like secure the segment 50 in place.

A bent piece of spring metal 58 has one end tucked into the flattened end 46 of the minor portion 32 while the other end thereof engages the underside of the minor portion 34. It will accordingly be apparent that the spring 58 acts to bias the members 12, 14 apart. A clip 60 acts to restrain or limit retracting movement of the pusher 18 and conveniently comprises a generally oval-shaped metal member 62 connected to the second member 14 by a rivet 64 or the like. The opposite end of the clip 60 comprises a free end 66 capable of movement toward and away from another end 68. It will accordingly be apparent that the constraint afforded by the clip 60 can be removed merely by moving the first member 12 out of the clip 60. This becomes particularly desirable when the spring 58 fails, as by fatigue, and needs to be replaced.

The pusher 18 may conveniently comprise a plastic rake having a plurality of tines 70 having the ends thereof extending from a flat section 72 having a plurality of generally horizontal slits therein forming a pair of loops 74 through which extends a flattened end 76 of the handle member 12.

Referring to FIG. 3, another form of pusher 78 is illustrated as secured to the handle member 12. The pusher 78 comprises a generally rigid planar plastic member 80 having a plurality of generally horizontal slits therein so that the flattened lower end 76 having a dimple 82 thereon can be inserted therethrough thereby securing the pusher 78 to the member 12. To give an example of the effectiveness of the pushing path of this invention, it is not difficult to flip a small coin off of a short nap carpet into the receptacle 20 with the pusher 78.

The receptacle 20 comprises a framework 84 of any suitable type for securing the open mouth of a bag 86 to the second member 14. One suitable configuration for the framework 84 and mode of connection of the bag 86 is illustrated in applicant's co-pending application Ser. No. 675,850, filed Apr. 12, 1976, now U.S. Pat. No. 4,048,691, to which reference is made for a more complete description thereof. In the alternative, the bag 86 may be hemmed along a line 88 to receive the framework 84. Preferably, the bag 86 is open at the rear thereof and is selectively closed in any suitable fashion, as by a drawstring 90.

The framwork 84 is desirably formed from an elongate bendable metal or plastic strip in which the free ends 92 are somewhat arcuately shaped as illustrated in FIG. 4. The free ends 92 are captivated in the lower end of the member 14 which is deformed into a generally figure-eight configuration. If desired, a bolt 94 and nut 96 may extend through the lower end of the member 14 to assure that the crimping done to the lower end does not release in use.

Figure 6:
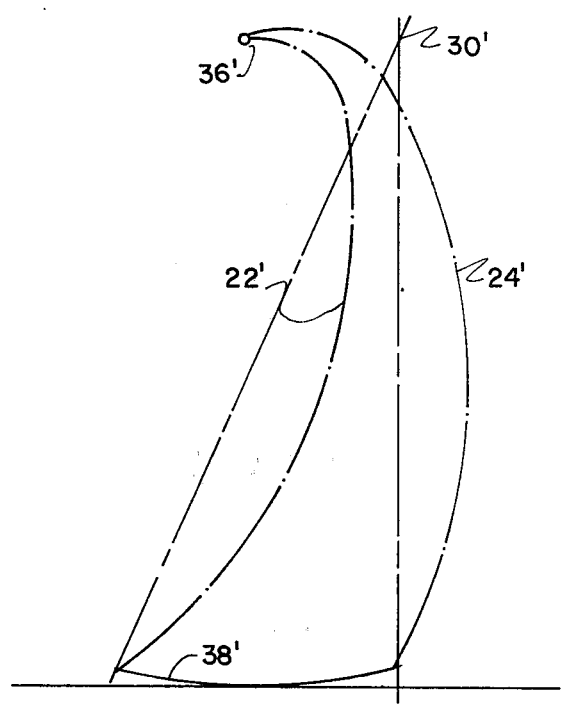
FIG. 6 is a line diagram illustrating another feature of the invention.

Referring to FIG. 6, another feature of the invention is illustrated. In FIG. 6, it is assumed that the major portions 22', 24' are arcuate while the axes 26', 28' thereof remain the same and intersect at the location 30'. Because the path 38' remains the same, it will be evident that it is the relationship of the axes 26', 28' of the members 22', 24' with the pivot axis 36' which establishes the pushing effectiveness of the pusher rather than the configuration of the members 22', 24'.

Referring to FIG. 7, there is illustrated another hinge connection 94 which performs basically the same function as the hinge connection of FIG. 2 and also allows for convenient disassembly of the device 10 so that the receptacle 20 and handle member 14 can be used separately from the pusher member 18. The hinge connection 94 acts to connect a pair of minor divergent portions 96, 98 together for pivotal movement about an axis 100. The terminal end 102 of the divergent portion 96 is flattened and provides an elongate slot 104 extending therethrough generally perpendicular to the axis of the terminal end 102. In addition, the terminal end 102 provides a slot 106 extending generally transversely thereof for receiving one leg of an arcuate generally U-shaped spring leaf 108 which bears on the underside of the divergent portion 98. The terminal end 110 of the divergent portion 98 is flattened and bent substantially perpendicularly to the axis of the divergent portion 98. The terminal end 110 also provides a foot 112 sized to pass into the slot 104 and providing a bent end 114 disposed on the underside of the terminal end 102 of the divergent portion 96. It will be apparent that the spring 108 acts to bias the divergent portions 96, 98 apart while the user may press the same together to cause advancing movement of the associated pusher.

It will be apparent that the hinge connection 94 allows disassembly of the device 10 merely by pivoting the handle members 12, 14 until the bent end 114 can clear the slot 104. It will be noted that the position in which the divergent portions 96, 98 are separable is out of the normal path of movement of the members 12, 14.

Figure 8:
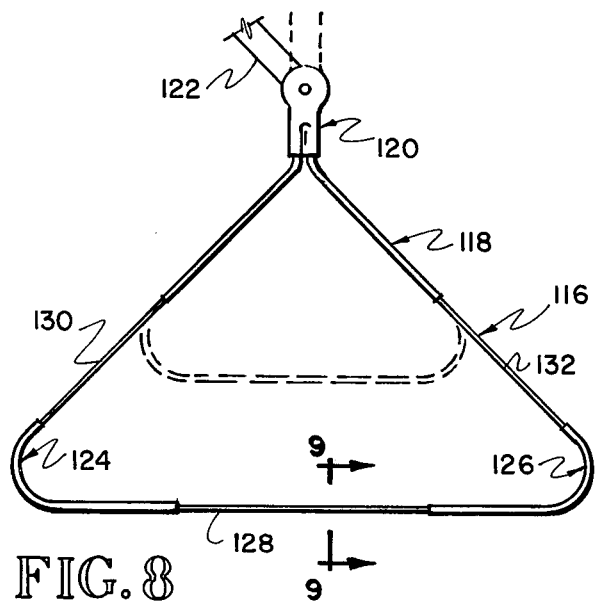
FIG. 8 is a front view of an improved sack frame.

Referring to FIG. 8, there is illustrated a preferred mode of construction of a framework 116 for holding open one end of a sack or bag. The framework 116 may be incorporated in the device 10 so that the pusher 18 thereof can be removed allowing the framework 116 to be used separated with a conventional broom or rake. This is particularly appropriate with the hinge connection 94. The framework 116 may be used to accomodate bags of widely different size by expanding or contracting the peripheral length of the framework 116.

To this end, the framework 116 comprises a triangle of adjustable periphery having a first corner member 118 frictionally fit in a holder 120 which may be pivotally or rigidly connected to a handle 122. In addition, the framework 116 includes a pair of second corner members 124, 126 each telescopingly receiving a pair of linear members 128, 130, 132.

Figure 9:
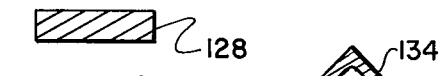
FIG. 9 is an enlarged cross-sectional view of the sack frame of FIG. 8, taken substantially along line 9—9 thereof as viewed in the direction illustrated by the arrows.
Figure 10:
FIGS. 10-12 are views similar to FIG. 9 illustrating other typical cross-sectional shapes suitable for the frame of FIG. 8.
Figure 11:
Figure 12:

As illustrated in FIG. 9, the linear members can conveniently be flat or planar. In the alternative, and as illustrated in FIGS. 10–12, comparable linear members 134, 136, 138 may be angular, corrugated, arcuate or any other suitable configuration.

Figure 13:
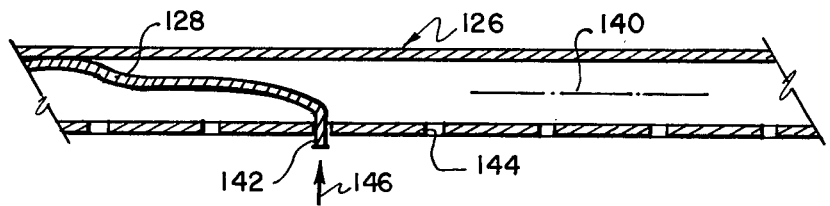
FIG. 13 is an enlarged cross-sectional view of the frame of FIG. 8 illustrating a mechanism for holding the telescoping elements together.

As illustrated in FIG. 8, the linear members 128, 130, 132 are adapted to be received in the corner members 118, 124, 126. Referring to FIG. 13, there is illustrated one technique for securing the linear members and corner members together in telescoping relation. The linear member 128 extends generally lengthwise of the axis 140 of one leg of the corner member 126 and includes an end portion 142 transverse to the axis 140 and adapted to be received in one of a plurality of openings 144 of any suitable configuration such as round or elongate, in the corner member 126. A central portion of the member 128 binds against one side of the corner member 126 while the end 142 extends through the other.

Because the linear member 128 is made of a somewhat resilient material, for example metal or plastic, pushing on the exposed end of the portion 142 with a small implement, such as a coin in the event the slot 144 is elongate, in the direction indicated by the arrow 146 causes the end portion 142 to clear the opening 144 thereby allowing the linear member 128 and corner member 126 to move in telescoping relation. It is apparent that the openings 144 and the end portion 142 comprise a latch operative between the members 126, 128. It will be equally evident that the periphery of the framework 116 is adjustable between the large cross-sectional, solid line position illustrated in FIG. 8 and the small cross-section, phantom line position illustrated therein. Accordingly, the framework 116 is capable of holding open a large sack in the fashion illustrated in FIG. 1 or in a manner illustrated in applicant's copending application Ser. No. 675,850, filed Apr. 12, 1976. Because the linear members 128, 130, 132 are removable from the corner members 118, 124, 126, it will be apparent that the framework 116 may be disassembled for shipping.

Figure 14:
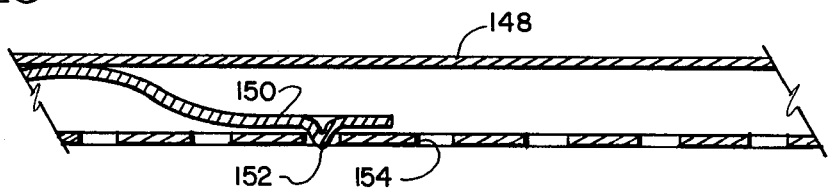
FIGS. 14-16 are views similar to FIG. 13 illustrating other typical latch mechanisms for holding the frame members in telescoping positions.

Referring to FIG. 14, there is illustrated a slightly different latch mechanism for securing together a leg 148 of a corner member and a linear member 150. The linear member 150 includes a dimple 152 adjacent one end thereof which cooperates with a plurality of openings 154 of any suitable configuration in the leg 148.

Figure 15:
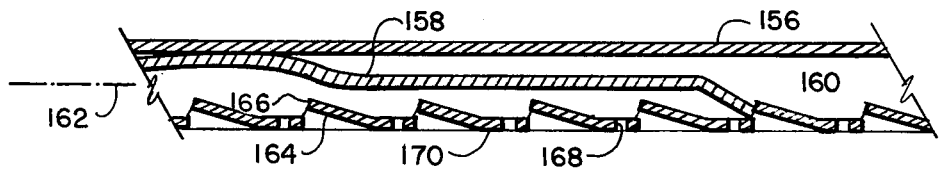

Referring to FIG. 15, there is illustrated a slightly different mechanism for latching an arm 156 to a member 158. An end portion 160 of the member 158 is bent at an acute angle to the axis 162 of the arm 156. One wall of the arm 156 is stamped to produce a plurality of sections 164 offset into the interior of the arm 156 providing a plurality of surfaces 166 transverse to the axis 162. The arm 156 is also stamped to produce a plurality of openings 168 in a relatively undisturbed portion 170 of the arm 156. Interference between the end portion 160 and the surface 166 acts to prevent collapsing movement of the member 158 inside the arm 156. The end portion 160 is moved out of contact with the surface 166 by extending a small member, for example a nail, through the opening 168 to engage the end portion 160 and move it upwardly and out of contact with the surface 166. The member 158 is then free to move in a collapsing direction inside the arm 156.

Expanding movement of the arm 156 and member 158 is retarded by frictional forces occurring between the inside surface of the arm 156 and the upper surface of the member 158. It will accordingly be evident that collapsing and expanding movement of the arm 156 and member 158 requires a modest amount of effort.

Figure 16:
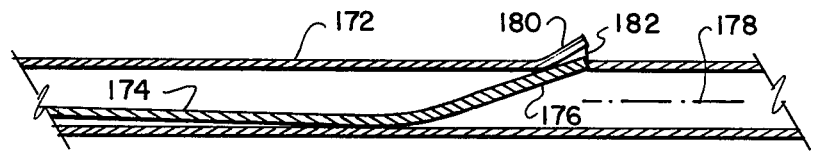

Referring to FIG. 16, there is illustrated a slightly different mechanism for latching an arm 172 of a corner member to a member 174. An end portion 176 of the member 174 is bent at an acute angle to the axis 178 of the arm 172. The upper wall of the arm 172 is stamped to produce one or more sections 180 offset toward the exterior of the arm 172 providing a substantially vertical surface transverse to the axis 178. Interference between the end portion 176 and the vertical surface acts to prevent collapsing movement of the member 174 inside the arm 172. The end portion 176 is moved out of contact with the vertical surface by extending a small member, for example a nail, through the opening 182 to engage the end portion 176 and move it downwardly and out of contact with the vertical surface. The member 174 is then free to move in a collapsing direction inside the arm 172.

Figure 17:
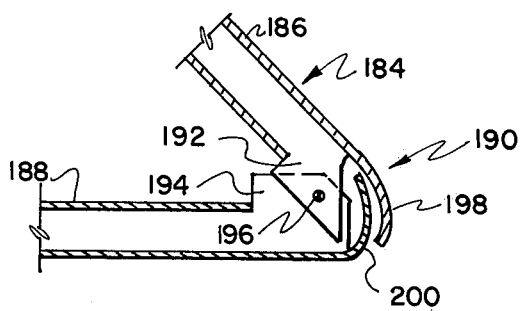
FIG. 17 illustrates a hinge connection that may be incorporated between the angled parts of the frame of FIG. 8.

Referring to FIG. 17, there is illustrated another embodiment 184 of a corner member comprising first and second generally tubular arms 186, 188 pivoted together by a hinge connection 190 for collapsing movement into a compact storage position. Accordingly, the framework 116 can be disassembled and collapsed for convenient storage and shipment. To this end, the arm 186 comprises a pair of ears 192 adapted to be received inside a pair of ears 194 provided by the arm 188. A hinge pin 196 acts to connect the ears 192, 194 while the terminal ends 198, 200 of the arms 186, 188 respectively are formed to allow limited pivotal movement.

Figure 18:
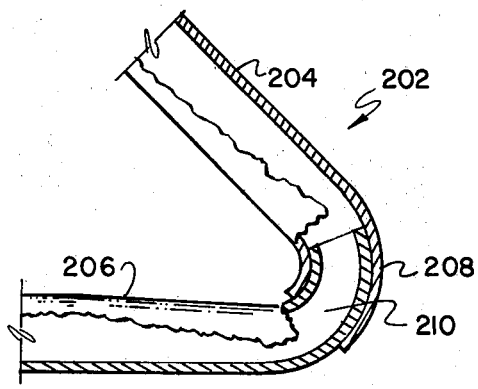
FIG. 18 illustrates another form of hinge construction for the angled parts of the frame of FIG. 8.

Referring to FIG. 18, there is illustrated another embodiment 202 of a corner member which is capable of disassembly. The corner member 202 comprises a pair of arms 204, 206 of generally tubular configuration having curved terminal ends 208, 210 arranged for telescoping movement. It will be apparent that the arms 204, 206 can be disassembled merely by untelescoping the terminal ends 208, 210.

Figure 19:
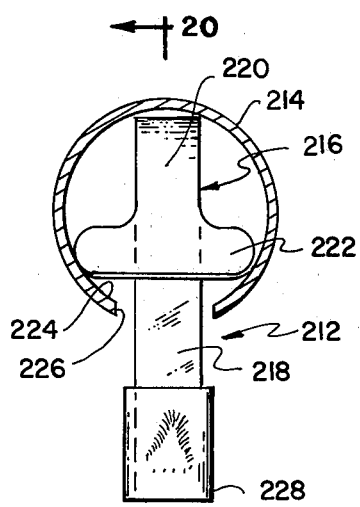
FIG. 19 is a top view of a device for holding a sack in place.
Figure 20:
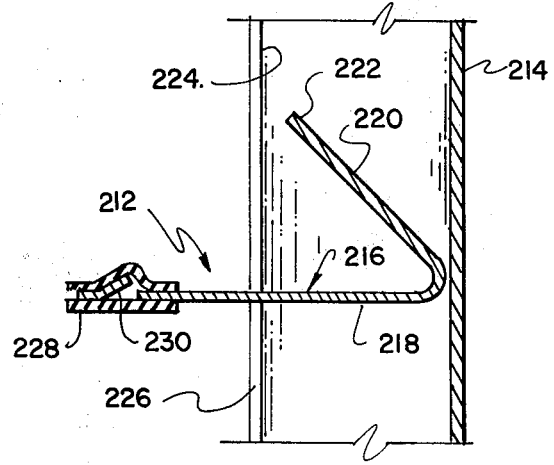
FIG. 20 is a cross-sectional view of the device of FIG. 19 taken substantially along the line 20—20 thereof as viewed in the direction indicated by the arrows.

Referring to FIGS. 19 and 20, there is illustrated an adjustable foot 212 mounted for vertical movement in a tubular or C-shaped handle 214 for grasping the sack or bag 86 in a manner somewhat similar to the arrangement illustrated in applicant's copending application Ser. No. 675,850, filed Apr. 12, 1976, to which reference is made for a more complete understanding of the device of FIGS. 19 and 20. The handle 214 is connected, at the lower end thereof, to the framework 116 and comprises a generally C-shaped element in cross-section as shown best in FIG. 19.

The foot 212 comprises an adjustable support 216 largely disposed inside the handle 214 and includes a pair of angularly disposed members 218, 220. As shown best in FIG. 19, the member 220 comprises an enlarged terminal end 222 bearing against the inner surface 224 of the handle 214 adjacent the vertically extending slot 226 therein. The support member 218 extends through the slot 226 and provides a bag engaging member 228 of relatively soft high friction material. The bag engaging member 228 conveniently comprises a piece of resilient tubing, for example surgical tubing, inserted over the end of the support member 218 and held in place by a prong 230 stamped out of the body of the support member 218.

Although the invention has been described in its preferred forms with a certain degree of particularity, it is understood that the present disclosure of the preferred forms has been only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exists in the invention disclosed.

I claim:
1. A device for pushing material into a receptable off of a generally horizontal surface, comprising first and second elongate members having first and second major divergent portions defining intersecting axes and first and second minor divergent portions respectfully comprising angled extensions of the first and second major portions;

a pusher on the lower end of the first portion;

a frame on the lower end of the second portion for mounting an opened mouth receptacle with the open mouth facing the pusher; and means pivotly mounting the first and second members for relative arcuate movement about an axis in a path juxtaposing the pusher and frame including a pivot connection interconnecting the ends of the minor divergent portions;

the pivot axis being offset from the intersection of the intersecting axes along the path of movement.

2. The device of claim 1 wherein the major portions are generally straight.

3. The device of claim 1 wherein the minor divergent portions reside in a common plane.

4. The device of claim 3 wherein the minor divergent portions are at least as long as the width of an adult hand.

5. The device of claim 4 wherein the first minor portion underlies the second minor portion when the frame rests on the surface.

6. The device of claim 5 wherein the first minor portion is of arcuate configuration.

7. The device of claim 1 further comprising means engaging and biasing the first and second elongate members apart.

8. The device of claim 7 wherein the biasing means comprises a generally U-shaped spring positioned adjacent the convergence of the minor portions and having a first leg connected to one of the minor portions and a second leg engaging the other minor portion.

9. The device of claim 7 wherein the biasing means comprises a spring operative in the convergence of the minor portions.

10. The device of claim 9 further comprising a guide for constraining movement of the members between a first position juxtaposing the frame and pusher and a second position separating the frame and pusher; the guide comprising a member having a long leg connected to one of the members and a curved leg receiving the other member in the second position, and a spring gate generally parallel to the long leg selectively allowing movement of the other member out of the guide.

11. The device of claim 1 wherein the second portion comprises a tube having a lower end of generally 8-shape in cross-section, the frame comprising a strap having first and second ends and an intermediate section defining the open mouth of the receptacle and joined at opposite ends thereof to the first and second strap ends, the first and second strap ends being inserted into the opposite ends of the 8-shaped lower tube end.

12. An arrangement for supporting a sack to receive material, comprising:

a peripheral frame comprising a first group of corner members providing first and second angularly related legs and a second group of generally linear members, one of the first and second groups of members being generally tubular having a passage thereinto and the other of the first and second groups of members having end portions telescopingly received in the passages;

means for latching the corner and linear members in a plurality of telescoping positions including a plurality of shoulders struck from the tubular members and at least one abutment provided by the end portions, the abutments engaging the shoulders in the plurality of positions and retaining the members in a selected one of the plurality of positions; and a handle supported by the frame so that part of the peripheral frame can be positioned on a surface to enable material on the surface to be moved into the open end of the sack.

13. The arrangement of claim 12 wherein the handle comprises a first section secured to the frame and an elongate second section for grasping by a user; and further comprising means adjustably pivotably mounting the first and second handle sections for securement in a plurality of angular positions.

14. The arrangement of claim 13 wherein the frame defines a plane and the adjustable mounting means comprises means mounting the second handle section for movement in a plane parallel to the first mentioned plane.

15. The arrangement of claim 12 wherein the frame is of generally triangular configuration having three corner members in which the legs thereof diverge at about 60 degrees.

16. The arrangement of claim 15 wherein the corner members are tubular.

17. The arrangement of claim 12 wherein the tubular members provide an opening therethrough adjacent each of the shoulders to provide access to the end portions for moving the same out of engagement with the shoulders.

* * * * *